May 15, 1945.
M. GILBERT
2,375,913
CHARCOAL GRILL
Filed June 24, 1942
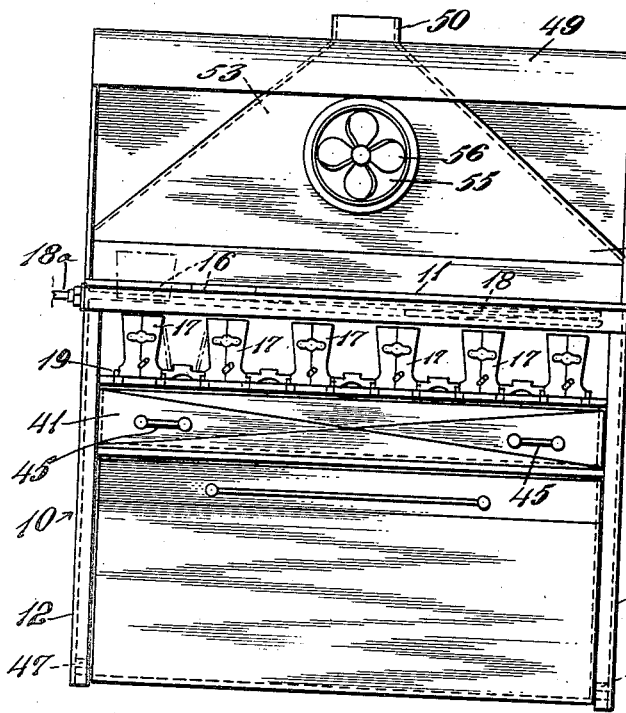
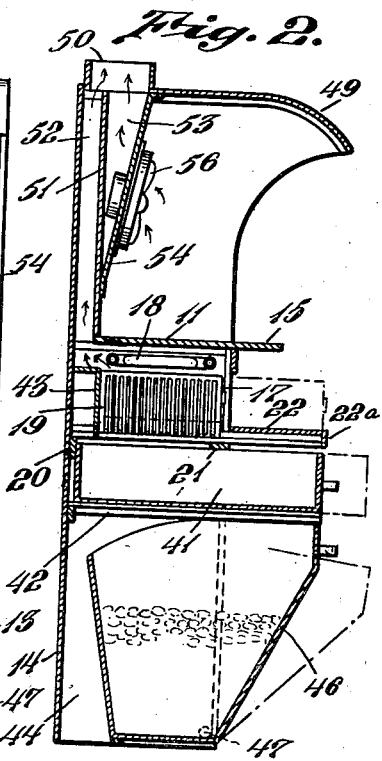
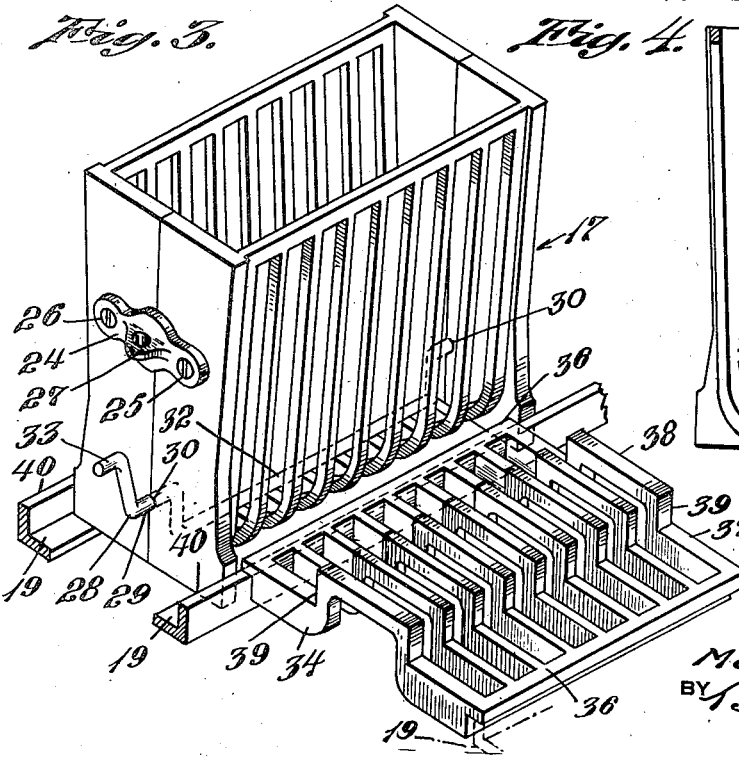
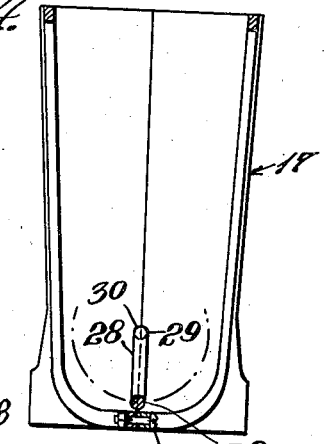
INVENTOR
Maxon Gilbert
BY Barlow & Barlow
ATTORNEYS Patented May 15, 1945

2,375,913

UNITED STATES PATENT OFFICE 2,375,913

CHARCOAL GRILL

Maxon Gilbert, North Scituate, R. I.

Application June 24, 1942, Serial No. 448,246

2 Claims. (Cl. 126—14)

This invention relates to improvements in stoves, particularly to so-called charcoal grills having an open fire for broiling meats, fish and the like.

Cooking devices of this general character have become very popular and food processed thereon has met with much favor with the public. However, in many instances the use of such devices in restaurants and like eating places has not been entirely successful economically. This is due in part to the necessity of maintaining in continuous burning condition a large body of charcoal during a lull period of trade in order to have a sufficiently large area of cooking space in readiness for any sudden demand thereon. Such large bodies of burning charcoal produce intense heat which is difficult to control and at times it becomes necessary to throw water over the fire to reduce the heat to prevent burning of the food. Further, in such devices of this character with which I am familiar the construction is such that only a fraction of the heat generated is utilized.

The objects of this invention are to provide a stove having the desirable characteristics of a charcoal grill; to utilize and to control to a greater extent than heretofore the heat generated by the burning fuel; to control the cooking area as to the size thereof to suit instant conditions of trade; and to provide for a more economical operation of the stove during a lull period of trade.

With these and other objects in view, the invention consists of certain novel features of construction, as will be more fully described and particularly pointed out in the appended claims.

In the accompanying drawing:

Fig. 1 is a front elevational view of a stove embodying my invention;

Fig. 2 is a central lateral sectional view of the stove shown in Fig. 1;

Fig. 3 is a perspective view of one of the fire boxes and food supports shown in relative position;

Fig. 4 is a lateral sectional view of the fire box shown in Fig. 3; and

Fig. 5 is a fragmental view of a detail of construction.

In carrying out this invention I provide a plurality of individual fuel baskets or charcoal fire boxes and these I arrange in such a manner that each may be removed from its normal location to a position to be refueled or for purposes of cleaning, and the like. The sides of each of these fire boxes are apertured, preferably in the form of a grate, to expose a maximum area of live coals to which the food to be broiled may be subjected. In this arrangement I may have all fire boxes charged and burning in order to provide a maximum area of cooking space to suit existing demand of trade, or I may have a minimum number of these fire boxes active during a lull in trade. The same fire boxes are utilized to heat a grill plate which is positioned at a location with respect thereto to subject the same to the direct action of the active fire boxes. On this grill plate food may be cooked in a usual manner. Openings are provided in a portion of the grill plate to receive pots and pans or an oven to subject these cooking utensils to the direct heat of the burning fuel to cook or bake the contents thereof as the case may be. A fuel reservoir in the form of a bin is also provided and housed in the body of the stove. This fuel bin opens at a location to have the fuel conveniently at hand when desired. In order to carry away the fumes of cooking food and excessive heat, conduits are provided and arranged in such a manner that an exhaust fan placed in one of the conduits will provide an aspirator effect in the other conduit.

With reference to the drawing for a more detailed description of the invention, in which drawing I have shown a selected embodiment of the invention, the numeral 10 designates a stove having a top plate 11 which I will designate a grill plate. This grill plate 11 is substantially the full length of the stove and is supported on the side walls 12—13 and extends widthwise of the stove short of the rear wall 14 and beyond the front edge of the stove a distance sufficient to provide a shelf 15 on which food to be, or after being, cooked may be supported. This grill plate is used to process food and for other purposes in the usual and well known manner. Openings 16 are provided at one end portion of this grill plate for receiving kettles or the like or an oven may be placed on the grill plate and heated by the transmission of heat through the openings 16.

Beneath the grill plate 11 a plurality of fire boxes 17 are disposed side by side and in spaced relation to each other. These are placed sufficiently close to the bottom of the grill plate to subject the same to the direct action of the burning fuel to be heated thereby. In the space between the grill plate 11 and the fire boxes a water heater is positioned, which heater in the instant case is in the form of a tubular coil 18, the ends 18a of which extend beyond the side wall 12, which ends may be connected to a water supply source and a storage vessel, all in a usual and well known manner.

These fire boxes 17 are slidably mounted and supported on tracks 19 which extend laterally of the stove and beyond the front edge thereof a distance substantially the length of the fire boxes. These tracks are in the form of iron bars L-shaped in cross section and disposed in pairs with the lower leg of each pair positioned opposite and toward each other. The tracks rest on and are secured, such as by welding, to cross bars 20—21 which cross bars extend the full length of the stove. Stainless steel plates 22 rest on the portion of the tracks which extends beyond the front edge of the stove. These plates provide a working table top on which food may be supported in preparing the same for cooking, and the like. There are two of these plates 22 the front edge portion of which is bent to provide a depending lip portion 22a to lay against the end of the tracks in order to cover the same from view. These plates are slidable lengthwise of the stove, one over the other in order to uncover those tracks of a fire box which is to be removed from beneath the grill to a position beyond the front edge of the stove in order to refuel the same or for other purposes desired.

Each fire box is in the form of a basket made of two substantially similar parts which may be a cast construction which when assembled and secured to each other as by bolts and nuts 23 will provide a fuel container open at the top and having grated sides and bottom walls connected by solid end walls, the bottom edges of which are adapted to rest and be slid along the tracks 19. The two halves of the fire box are additionally held together by a strap 24 which has one end portion thereof secured to one of the halves by a stove bolt 25 and to the other half by a stove bolt 26. This strap 24 has an apertured ear 27 protruding therefrom which may be engaged by a hook or like tool to pull thereon for removing the fire box from beneath the grill plate 11. In order to control the depth of fire in the fire boxes each is provided with a shaker 28 operable to loosen and permit the escape through the grate of the ashes formed by burning of fuel. This shaker 28 is in the form of a crank providing opposite arms 29 which are journaled in the openings 30 in the end walls of the fire box and an offset portion 32 positioned into and extending nearly the length of the fire box. A handle 33 is provided for agitation of the shaker 28.

It will now be apparent that each fire box is constructed in a manner so as to provide an open fire for broiling food by exposing it to the live coals. In order to properly support food in a position to expose the same to the live coals a support 34 on which food may rest while being cooked, is provided in the form of a grate and consists of a frame having sides 36 connected to each other by spaced bars 37 the central portion of which is offset as at 38 providing shoulders 39. These supports are removably mounted in the space between the fire boxes and rest on the upper edges 40 of the track 19. The food to be broiled may rest directly on the support and lay against the sides of the fire box or the food may be held in any suitable device well known in the art of broiling and the device placed on this support in an appropriate manner and the food held therein cooked on each side simultaneously. Any drippings from the cooking food will escape through the space between the bars 37.

Directly beneath the fire boxes 17 a drawer 41 is slidably mounted for receiving the ashes and drippings of the cooking food. The drawer 41 rests and slides on angle irons 42, and handles 45 are provided for conveniently manipulating the drawer. The drawer 41 is of a width to be disposed beneath the forward extending portion of the tracks to receive the ashes from the fire boxes when moved forwardly of the front edge of the stove, and provides a cover for a fuel bin 46. This fuel bin is disposed in the lower portion of the stove and has a portion of the upper part thereof extending forwardly of the body of the stove in line with the front surface of the drawer 41. This fuel bin 46 is pivotally mounted at its lower end portion with the pivot pins 47 so located with respect to the form of the bin that the center of mass will be at a location rearwardly of the pivot. This arrangement will tend to move the bin 46 about the pivotal mounting in a direction to close the bin, to automatically return the same to closed position upon the release thereof. This will assure the bin being closed at all times except when held opened to remove fuel therefrom to refuel the fire boxes.

In order to permit the escape of fumes of cooking and the like, a hood member 49 is provided having side walls joining the rear wall 14 of the stove and a top wall having a curved front portion overhanging the marginal edge of the grill plate. This provides a partial closed space directly about the grill plate 11. In the upper wall of the hood 49 there is a conduit 50 which may be properly piped to the atmosphere. At the rear edge of the grill plate 11 and spaced from the rear wall 14 there is an upstanding wall 51 which with the side wall of the hood forms a branch conduit 52 opening into the conduit 50 and into the space in which the fire boxes are located. A baffle plate 43 that extends from one side wall to the other is positioned rearwardly of the fire boxes. The upper edge portion of this baffle is bent toward and into engagement with the rear wall 14 of the stove. This arrangement effectively shuts off from the conduit the space in the body of the stove below the fire boxes and provides a stop for the proper alignment of the fire boxes. A second branch conduit 53 opening into the conduit 50 is provided for the escape of fumes and the like from the space above the grill plate 11. This conduit has a front wall 54 having an opening 55 therein in which an exhaust fan 56 is mounted. In this arrangement of exhausting the fumes of cooking and the like, an aspirator action is provided in the branch conduit 52 to aid in drawing upwardly the fumes and the like from what may be termed the broiling chamber of the stove and also in providing an additional draft for this chamber.

It will now be apparent that I have provided a stove which is of general utility in which the broiling area capacity of the stove may be controlled as to effective broiling areas to suit the condition of trade, and in which the heat usually wasted in charcoal grills is utilized to heat the grill plate and provide hot water. It will also be apparent that each fire box is a complete unit and the burning fuel therein individually controlled, thus providing for the economical operation of the stove.

I claim:

1. In a cooking stove, a grill plate, a plurality of parallel spaced guiding means beneath said plate extending from beneath said plate to a point in front of and out from beneath said plate, a fire box for each guiding means each comprising end walls having laterally extending portions shaped at their lower portions to fit said guiding means and mounted thereon for sliding movement therealong and intermediate side walls connecting said end walls and carried thereby and spaced from said guiding means whereby each of said fire boxes may be independently movable to and from a loading position in front of the plate to a position beneath the plate for heating the same.

2. In a cooking stove, a grill plate, a plurality of parallel spaced tracks beneath said plate extending from beneath said plate to a point in front of and out from beneath said plate, a fire box for each of said tracks each comprising end walls having laterally extending portions shaped at their lower portions to fit said tracks and mounted thereon for sliding movement therealong and intermediate side walls connecting said end walls and carried thereby and spaced from said tracks whereby each of said fire boxes may be independently movable to and from a loading position in front of the plate to a position beneath the plate for heating the same and a common receptacle of the full depth of said tracks of a size to be beneath all of said fire boxes at one time in either of their positions beneath or removed from beneath said plate.

MAXON GILBERT.